United States Patent Office.

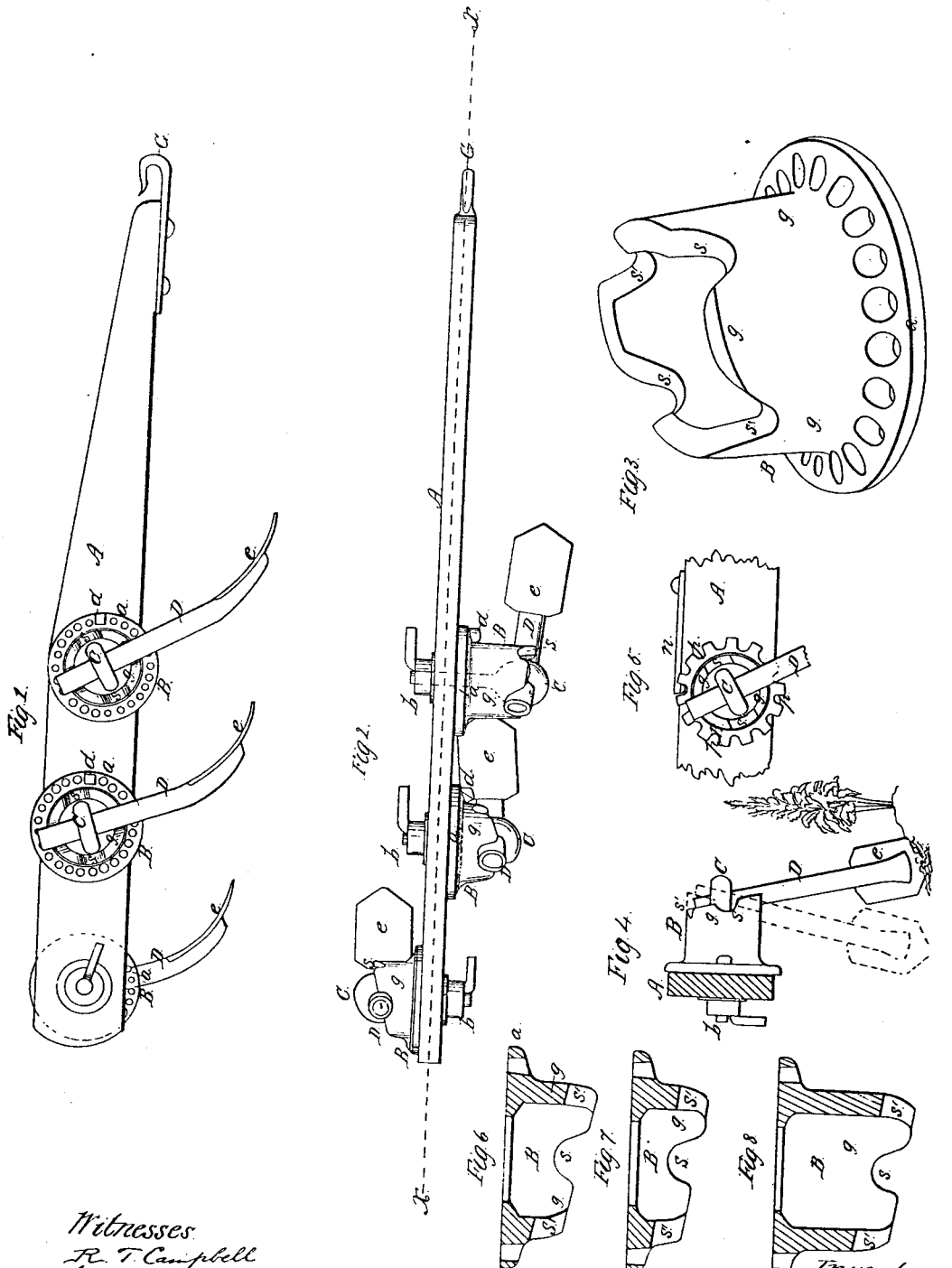

GEORGE W. ZEIGLER, OF MAUMEE CITY, OHIO.

IMPROVEMENT IN CULTIVATORS.

Specification forming part of Letters Patent No. 86,794, dated February 9, 1869.

*To all whom it may concern:*

Be it known that I, GEORGE W. ZEIGLER, of Maumee City, in the county of Lucas and State of Ohio, have invented certain new and useful Improvements in Cultivators; and I do hereby declare that the following is a full, clear, and exact description thereof, reference being had to the accompanying drawings, making a part of this specification, in which—

Figure 1 is an elevation of one side of my improved cultivator. Fig. 2 is a top view of the cultivator. Fig. 3 is a perspective view of one of the standard-bearing thimbles. Fig. 4 is a transverse section through the cultivator-beam, showing a shovel and its standard inclined laterally in two directions. Fig. 5 is a side view of one of the thimble-bearings having a toothed flange to receive a spring-retaining dog or pawl. Figs. 6, 7, and 8 are diametrical sections through the thimble-bearings, showing their construction and relative length.

Similar letters of reference indicate corresponding parts in the several figures.

This invention relates to certain novel improvements on cultivators or plows which have all of their shovel-standards applied to a single draft-beam, and so arranged as to run in a gang between the rows of plants.

One serious objection attending single-beam cultivators which have their shovels or plows arranged in gangs is that in drawing the machine along between the rows of plants the resistance against the rear shovel or plow is so great as to overcome the resistance against the front shovel or plow, and thereby cause the beam to assume an oblique position to the line of draft, which brings the rear shovel or plow in, or nearly in, the furrow made by the front shovel. To overcome this lateral tendency of the rear end of the beam in working single-beam cultivators heretofore made, the plowman is required to press with his body against one of the handles, which is very laborious.

To overcome this objection the nature of my invention consists in having the shovel-standard nearest the front of the draft-beam adjusted so far from the side of this beam as to overcome the lateral resistance of the earth upon the rear shovel on the opposite side of the beam, as will be hereinafter explained.

The invention also consists in novel means of securing the standards of the shovels or plows to the sides of the draft-beam, whereby offsets or thimble-bearings and eyebolts are adapted to afford substantial bearings for receiving and rigidly confining the standards in their places and admitting of the adjustment of these standards, either in vertical planes and at any required degree of backward pitch, or in planes inclining more or less to the right or left, as may be required.

To enable others skilled in the art to understand my invention, I will describe its construction and operation.

In the accompanying drawings, A represents the draft-beam of the cultivator, which may be made of any required length, and which has a simple hitching-hook, G, secured to its front end, by which to attach the team for drawing the machine. The hook G is secured in line with the beam, and is the only means of attachment required, as my improvement, hereinafter explained, renders a clevis or other adjustable means of attachment unnecessary.

B B B represent three tubular or thimble bearings, two of which are secured on one side of the beam A and the other one is secured on the opposite side of this beam, near its rear end, and shall be hereinafter termed the "rear" thimble-bearing.

It will be seen by reference to Fig. 2 that the three thimble-bearings vary in length, but in all other respects they are constructed alike; therefore the following description of one will apply to the others. The body of the thimble-bearing B is preferably made cylindrical or circular, and it has an opening centrally through it for receiving an eyebolt, C, and allowing the screw-stem of this bolt to pass laterally through the beam A. One end of this bearing has a circular flange, *a*, formed on it, which not only increases the area of its bearing against the side of the beam A, but affords a means for securing the thimble-bearing against casual turning, when applied to beam A, by the use of a wooden pin, *d*, inserted through one of a number of holes made through said flange and into said beam, as shown in Figs. 1 and 2, or by the use of a spring-pawl, *n*, catching into one of a number of notches, *p*, made in the periphery of said flange, as shown in Fig. 5. The object of the said attachments *d* or *n* is to hold the thimble-bearing firmly against turning about its axis under ordinary pressure against its shovel, and to yield and allow the shovel, with its thimble-bearing, to swing backward should the shovel meet with such an obstruction in its pass as would be liable to break or derange the parts. In one case the pin *d* would break and allow the thimble to turn back, and in the other case the tooth or pawl *n* would rise and allow its thimble to turn.

Still another plan may be adopted for holding a simple bearing in the desired position under ordinary pressure and allowing it to give way under extraordinary strain. This plan is shown applied to the rear thimble-bearing B of the rearmost shovel in Figs. 1 and 2, and consists in confining said thimble-bearing to the beam, so that it will slip only when subjected to undue strain. Opposite this flange *a* the open end of the thimble-bearing has its edge grooved transversely, as clearly shown in the drawings, for the purpose of affording receptacles and bearings for a shovel-standard. The grooves or notches are made diametrically opposite each other, as shown, and two of them, *s s*, are made of equal depth, and adapted for holding a shovel-standard in a vertical plane parallel to the sides of the beam A, and at any desired backward pitch, as indicated by the rear shovel-standard in Fig. 2. The other two grooves or notches, *s' s'*, differ from each other in depth, and are adapted for holding a shovel-standard in a position inclined laterally either to the right or left, as indicated in Fig. 4. For cylindrical standards I prefer to form said notches or grooves with rounded bearing-surfaces, as shown, so as to afford good bearing-surfaces for the said standards, and serve, in conjunction with the eyebolts C and their nuts *b*, for confining the standards rigidly in place.

To apply a standard, D, to a thimble-bearing, B, the upper end of the standard is passed through the eye of said bolt a suitable distance and the screw-shank of the bolt passed through a hole made transversely through the beam A. The standard is then adjusted in either the grooves *s s* or *s' s'*, according to the position it is required to give it with respect to a vertical plane, and the lever-nut *b* applied on the bolt C and screwed up tight. This will not only confine the standard to its thimble-bearing, but will also confine the thimble-bearing firmly to the beam A.

Each thimble-bearing is cast or otherwise made of a single piece of metal, and if it is not desired to adopt either of the above-mentioned plans for allowing it to turn when subjected to undue strain the flange *a* may be dispensed with.

The socket or opening in the grooved or notched end of each thimble-bearing should be large enough to receive into it freely the eye on the bolt C, but this hole or opening need not be much larger than the shank of this bolt where it passes through the flanged end of the thimble.

It will be seen by reference to Fig. 2 that the thimbles B are arranged one in rear of the other, and that two of these thimbles are applied on one side of beam A and the other one on the opposite side of this beam, near its rear end. These thimbles are made of different lengths for the purpose of having the shovels run in different tracks by arranging them in a line oblique to the beam A, as shown. In constructing and arranging these thimbles reference must be had to their length, and the front thimble B should be made of such length with reference to the rear thimble B that the resistance of the earth upon the front shovel *e* will counteract any tendency of the resistance upon the rear shovel *e* to throw the draft-beam laterally out of line with the line of draft indicated by red line *x x*, in Fig. 2.

It is obvious that if the rear shovel bearing or thimble B were made as long as the front shovel-bearing or thimble B, the former, being more remote from the draft-hook G, would have a longer leverage than the front thimble, and consequently the resistance upon the shovel of this rear thimble would cause the draft-beam to assume a position diagonal to the rows of plants, which would bring the three shovels *e e e* in the same line longitudinally; but by making the front thimble B of greater length than the rear thimble, so that the shovel of the front thimble is farther from the side of the draft-beam than the shovel of the rear thimble, the increased lateral resistance afforded by the front shovel will overcome the lateral tendency of the resistance upon the rear shovel. By thus adjusting the shovels upon a single beam, A, this beam will be held in line with the line of draft, and the labor of the plowman, who follows behind the machine and guides it by means of suitable handles, (not shown in the drawings,) will be greatly diminished. This feature of my invention is not only advantageous when applied to a hand-machine, but it is well adapted for the machines when applied to a carriage-frame where the attendant rides upon the machine. I do not confine this feature of my invention to the use of the thimble-bearings constructed precisely as herein described and shown, although I prefer to adopt these improved thimbles as other bearings or offsets adapted for holding the standards.

The shovel-standards D may be made of wood or metal, and the shovels or plows *e* may be made of any suitable shape adapted to the different purposes they are designed to serve. I prefer to construct the shovel or plow standards D hollow, and for this purpose I use an article known in the market as "gas-pipe" cut in proper length, and properly flattened and curved at the lower ends to receive and have attached to them, in a suitable manner, the shovels or plows. This affords light and strong standards which can be made with greater facility and much cheaper than any other kind.

From the above description it will be seen that I am enabled to keep the beam A in line with the line of draft without the exercise of manual labor on the part of the plowman; also, that I am enabled to adjust the standards of the shovels or plows vertically, incline them laterally either to the right or left, and give them any desired pitch or inclination. I also afford the said standards substantial bearings, and secure each one of them, with its thimble, to the beam A by means of a single eyebolt and nut, b, by loosening which latter any of said adjustments can be effected.

Broadly considered, I do not claim a single-beam cultivator; neither do I claim providing adjustments for the shovel-standards of a cultivator which will allow such standards to be adjusted and set in different planes.

Having described my invention, what I claim as new, and desire to secure by Letters Patent, is—

1. In a single-beam cultivator, so adjusting the shovels, by making the front and rear bearings or offsets of different lengths, that the tendency to lateral deviation of the rear end of the beam A by the resistance of the earth upon the front shovel, substantially as described.

2. A hollow thimble-bearing, B, constructed with notches a a', in its end, adapted for receiving a shovel-standard, and admitting of the adjustment of such standard in different planes, substantially as described.

3. The construction of the hollow thimble-bearing with a flange, a, on one end and notches a' in the opposite end, substantially as and for the purposes described.

4. The notched thimble-bearing B, in combination with an eyebolt, C, and shovel-standard D, constructed substantially as described.

5. A single-beam cultivator having its shovel-standards confined to notched or grooved thimbles or offsets of different lengths by means of eyebolts, which also confine the said thimbles or offsets to their beams, substantially as and for the purposes described.

GEORGE W. ZEIGLER.

Witnesses:
E. W. ANDERSON,
JULIUS HIRSCH.